United States Patent
Batts

[11] Patent Number: 5,357,901
[45] Date of Patent: Oct. 25, 1994

[54] PET COMFORTER

[76] Inventor: Doris B. Batts, 1609 Clearview Ave., Oxon Hill, Md. 20745

[21] Appl. No.: 111,427

[22] Filed: Aug. 25, 1993

[51] Int. Cl.$^5$ ............................................. A01K 1/02
[52] U.S. Cl. ................................................. 119/28.5
[58] Field of Search ............... 119/19, 28.5; 5/494, 5/923, 460, 462, 471, 420, 470

[56] References Cited

U.S. PATENT DOCUMENTS

| | | | |
|---|---|---|---|
| D. 221,558 | 8/1971 | Zimmerman . | |
| 1,323,610 | 12/1919 | Price | 5/420 |
| 2,775,222 | 12/1956 | Kruck | 119/19 |
| 3,565,040 | 2/1971 | Pohl | 119/19 |
| 4,008,687 | 2/1977 | Keys | 119/28.5 |
| 4,169,428 | 10/1979 | Waugh | 119/19 |
| 4,601,076 | 7/1986 | Knobeloch | 5/420 |
| 4,680,821 | 7/1987 | Maguire | 5/494 |
| 5,093,947 | 3/1992 | Henegar et al. | 5/420 |
| 5,099,530 | 3/1992 | Scott | 5/470 |
| 5,144,911 | 9/1992 | Moore et al. | 5/470 |

FOREIGN PATENT DOCUMENTS 1588724 4/1981 United Kingdom ............... 5/460

*Primary Examiner*—Gene Mancene
*Assistant Examiner*—Todd E. Manahan
*Attorney, Agent, or Firm*—Donald A. Kettlestrings

[57] ABSTRACT

A pet comforter provides warmth and comfort to pets and includes a cushion, a cover for removably receiving the cushion therein and a blanket attached to the cover along a portion of the edge so that the cover can be folded over to double thickness at the ends.

2 Claims, 8 Drawing Sheets

5,357,901

PET COMFORTER

BACKGROUND OF THE INVENTION

This invention relates to a product for use by pets and more particularly to a pet comforter for keeping pets warm and comfortable.

An object of the present invention is to provide a comforter for use by pets.

Another object is to provide a comforter which is designed to keep pets warm and comfortable during winter months and in air conditioned homes.

Still another object is to provide a pet comforter which is completely washable in soap and water.

A further object of the invention is the provision of a pet comforter which is attractive in appearance.

A still further object is to provide a pet comforter which is small and compact and easily portable.

Another object is to provide a pet comforter wherein the blanket and cushion portions thereof are attached to each other so they cannot be separated and they are always available for use together in the intended manner.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides a pet comforter which comprises a cushion, a cover for removably receiving the cushion therein, and a blanket attached to the cover.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate examples of preferred embodiments of the invention and, together with the description, serve to explain the principles of the invention.

DESCRIPTION OF THE PREFERRED EMBODIMENTS

Figure 1:
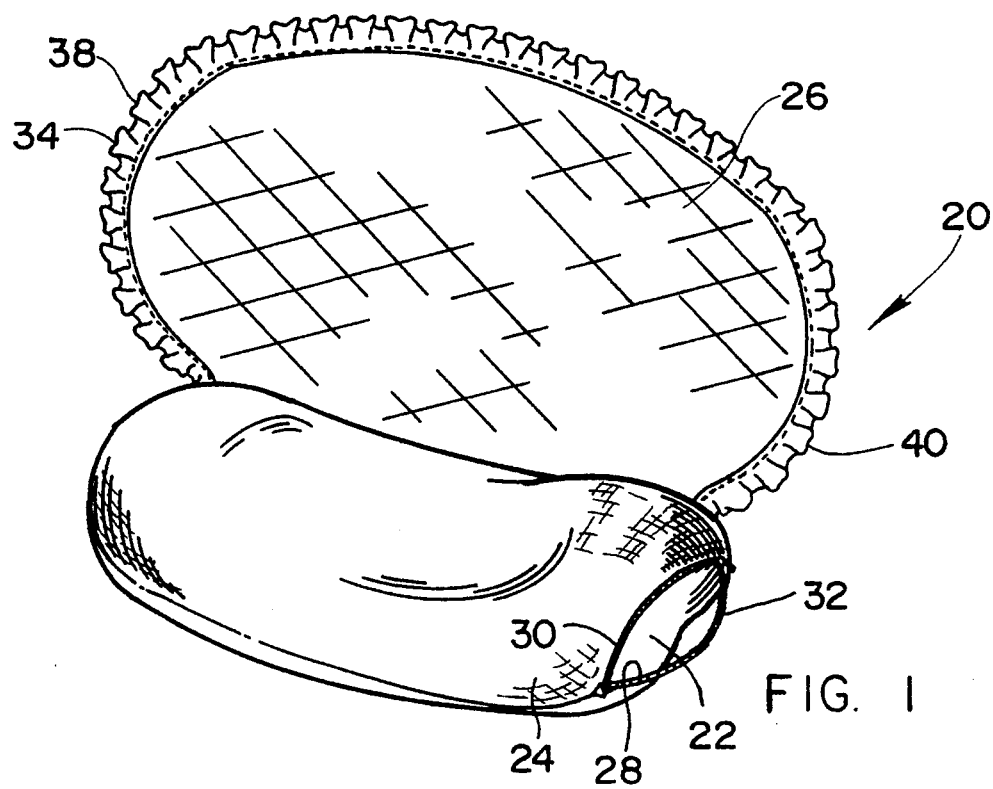
FIG. 1 is a perspective view of one embodiment of the invention.

With reference now to the drawings, wherein like reference characters designate like or corresponding parts throughout the several views, there is shown in FIGS. 1-5 a first embodiment of pet comforter 20. In accordance with the invention, comforter 20 includes a cushion 22. A cover 24 is provided for removably receiving cushion 22 therein, and a blanket 26 is attached to cover 24.

Cover 24 defines a first opening 28 therein for enabling cushion 22 to be inserted into and removed from cover 24. First means 30 are provided in operative relationship with opening 28 for selectively opening and closing opening 28, and first means 30 is preferably a zipper 32.

Blanket 26 defines a perimeter 34, and blanket 26 is attached to cover 24 along a predetermined portion 36 of blanket perimeter 34.

Figure 2:
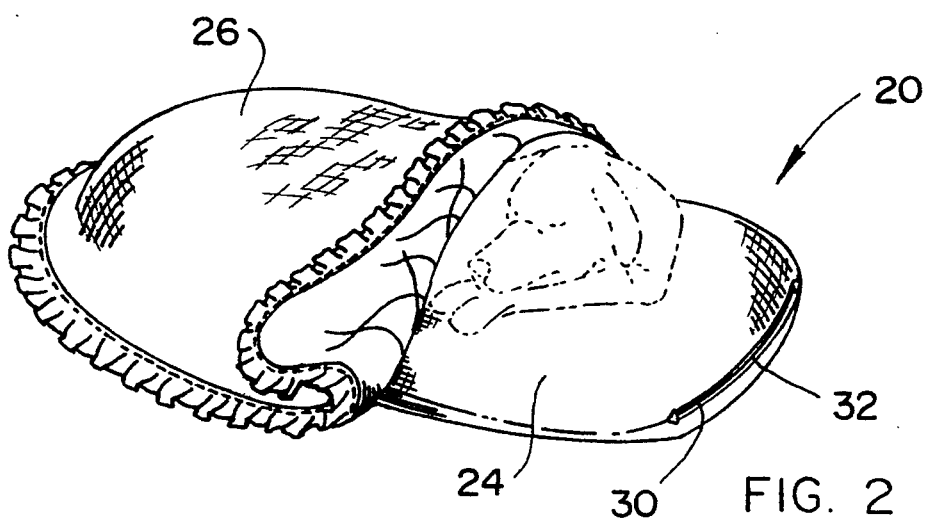
FIG. 2 is a perspective view of the embodiment shown in FIG. 1 and illustrating the comforter in use with the blanket portion covering a dog and folded double at one end.
Figure 3:
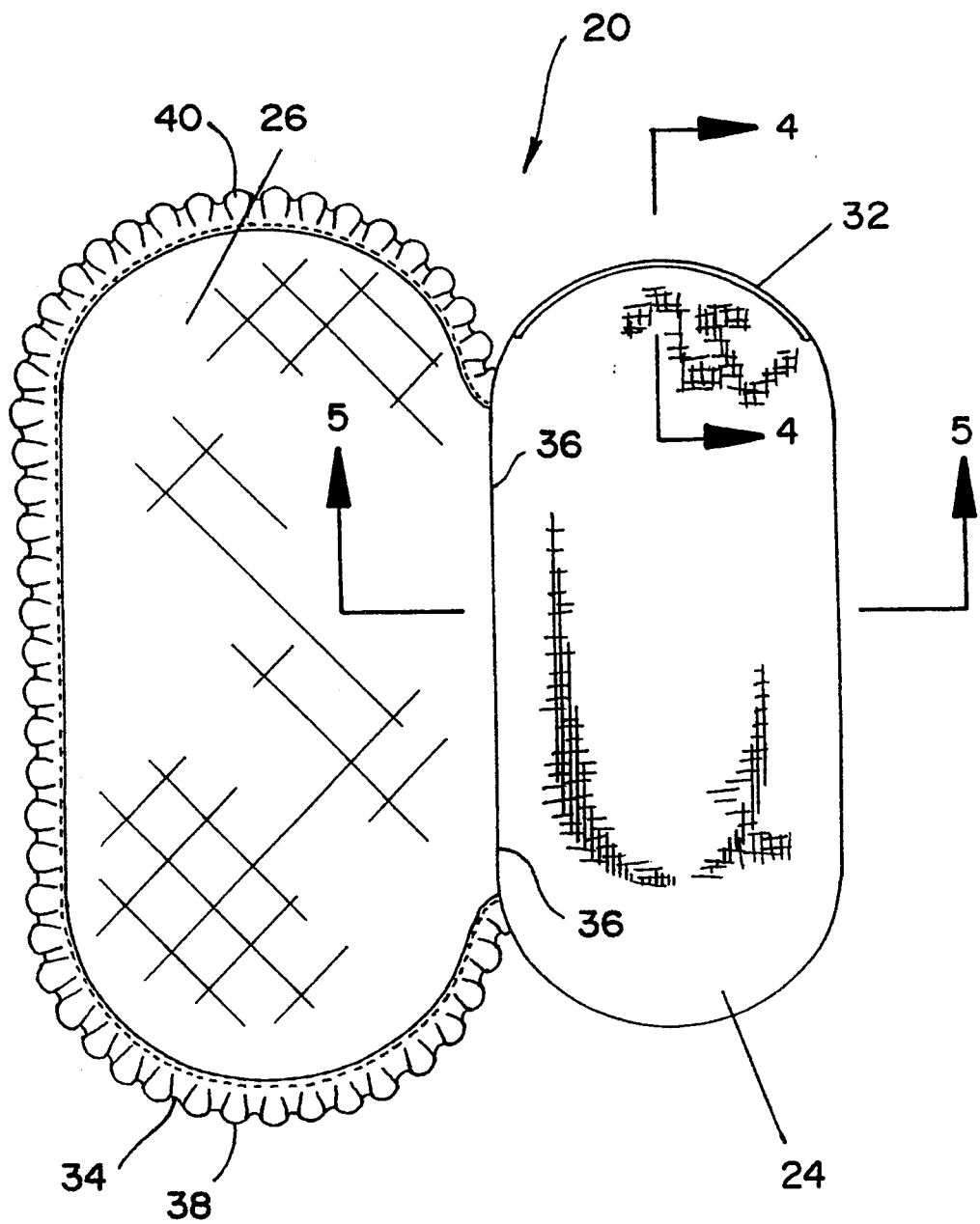
FIG. 3 is a top plan view of the embodiment shown in FIG. 1 and illustrating the blanket portion opened to a position which does not cover the cushion.

Blanket 26 defines a lengthwise dimension between ends 38, 40 of the blanket, and predetermined portion 36 of blanket perimeter 34 is less than the lengthwise dimension of the blanket so that the blanket can be folded to double thickness, for example, adjacent to ends 38, 40 of the blanket when the blanket is positioned over cushion 22 and cover 24. An example of this feature is shown in FIG. 2.

Blanket 26 preferably defines an area substantially equal to the area defined by cushion 22 so that the blanket will completely cover the cushion. Cushion 22, cover 24 and blanket 26 are all preferably washable with soap and water.

Figure 4:
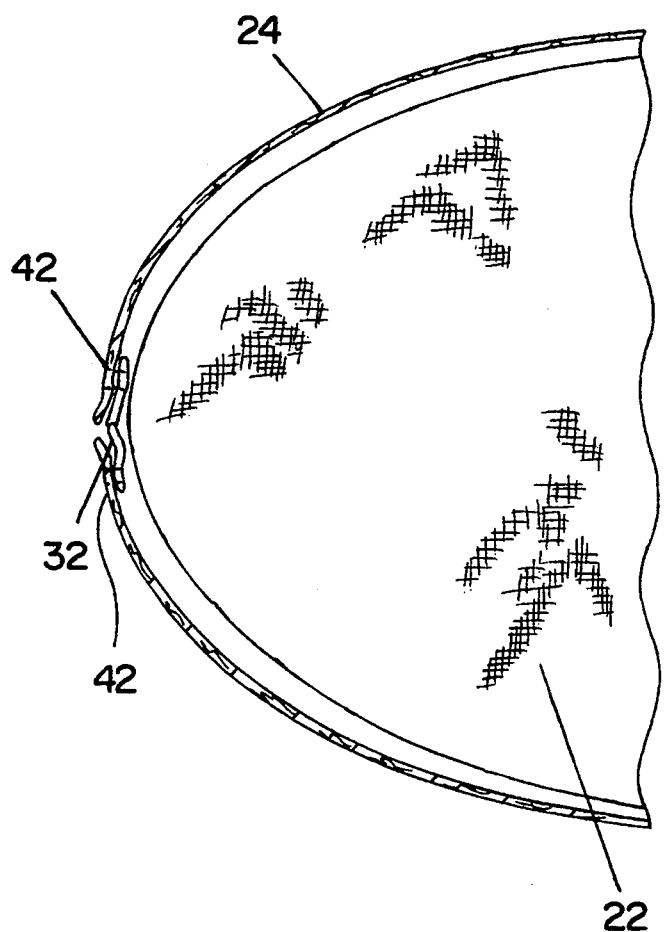
FIG. 4 is a fragmentary cross sectional view of the comforter taken along the line 4—4 in FIG. 3 and looking in the direction of the arrows.
Figure 5:
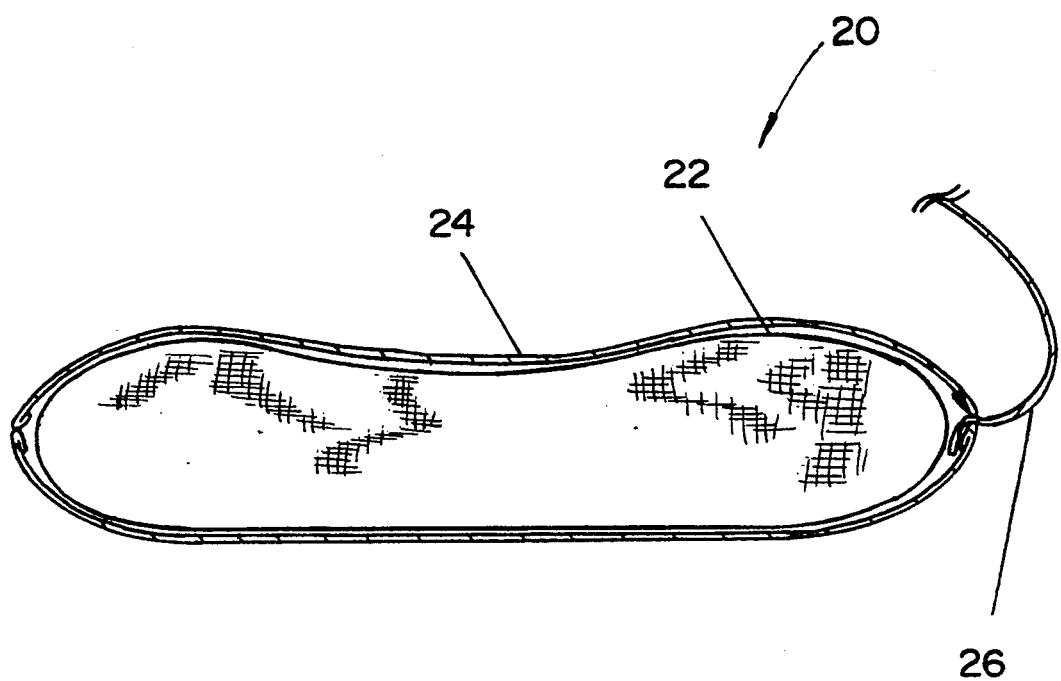
FIG. 5 is a fragmentary cross sectional view of the comforter taken along the line 5—5 in FIG. 3 and looking in the direction of the arrows.
Figure 6:
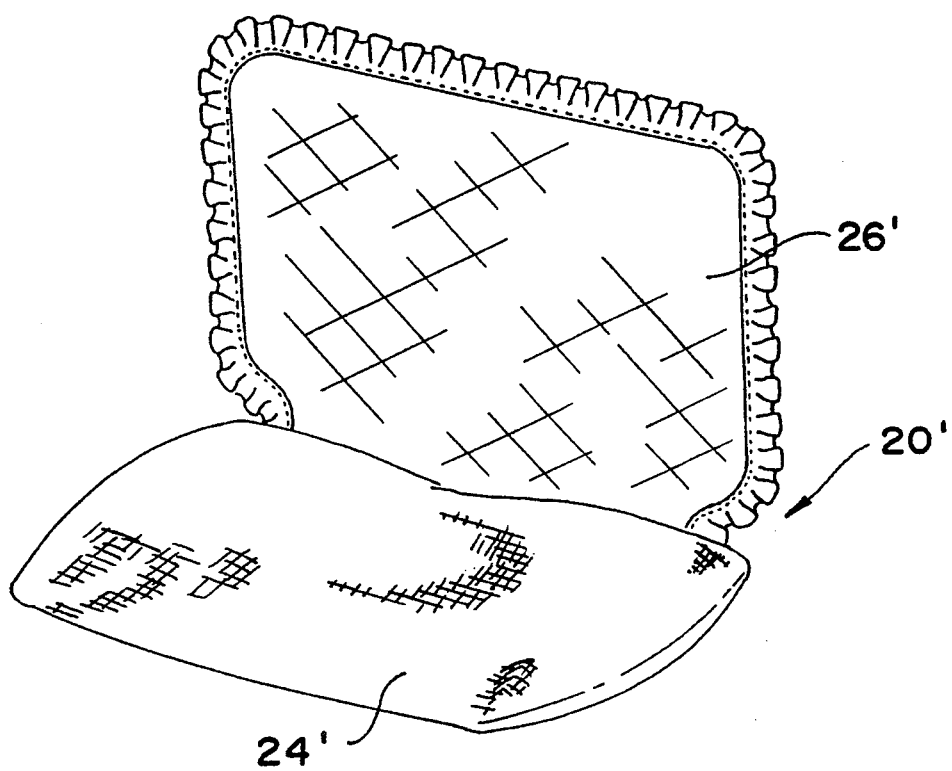
FIG. 6 is a perspective view of another embodiment of the invention.
Figure 7:
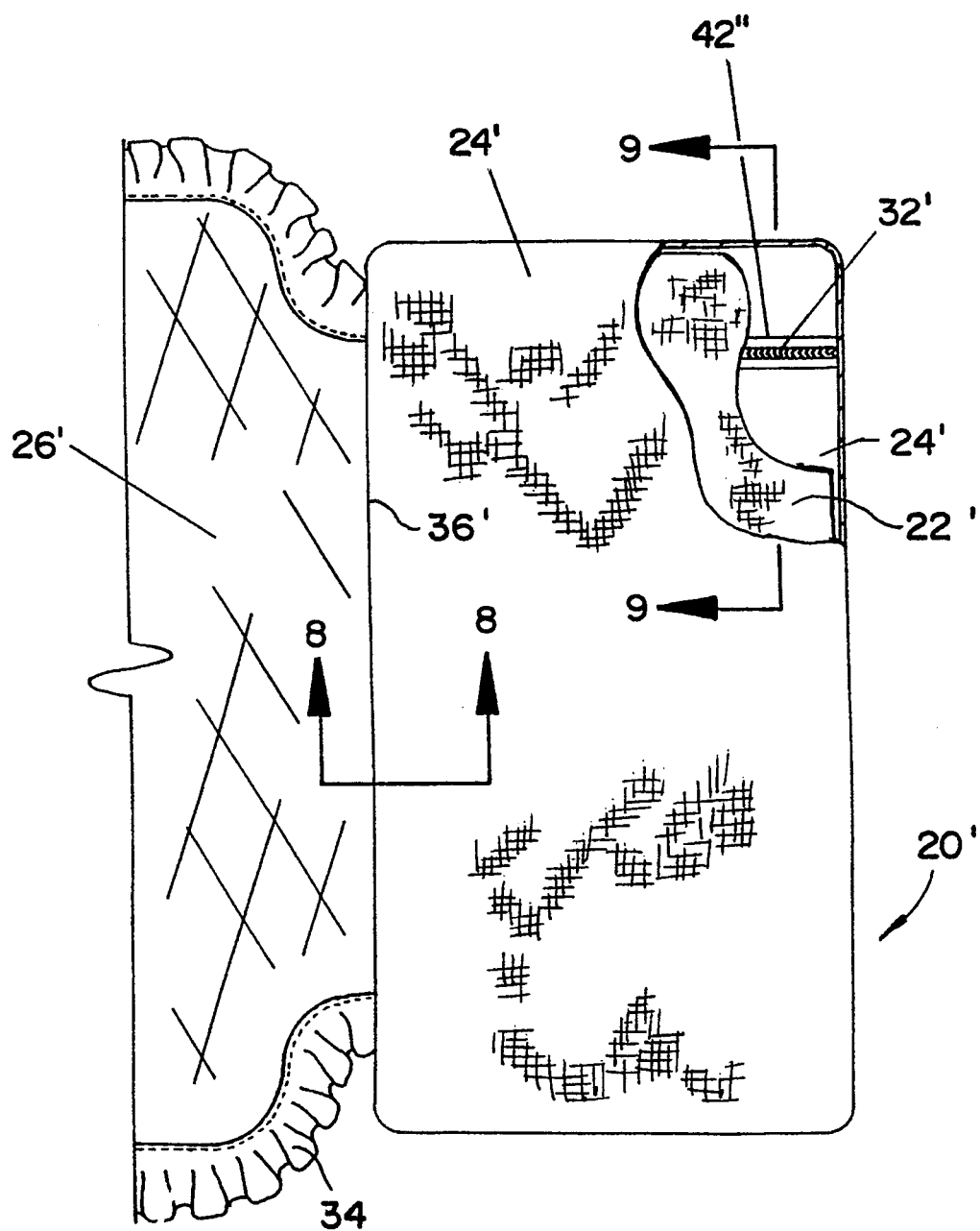
FIG. 7 is a fragmentary top plan view of the comforter embodiment shown in FIG. 6.
Figure 8:
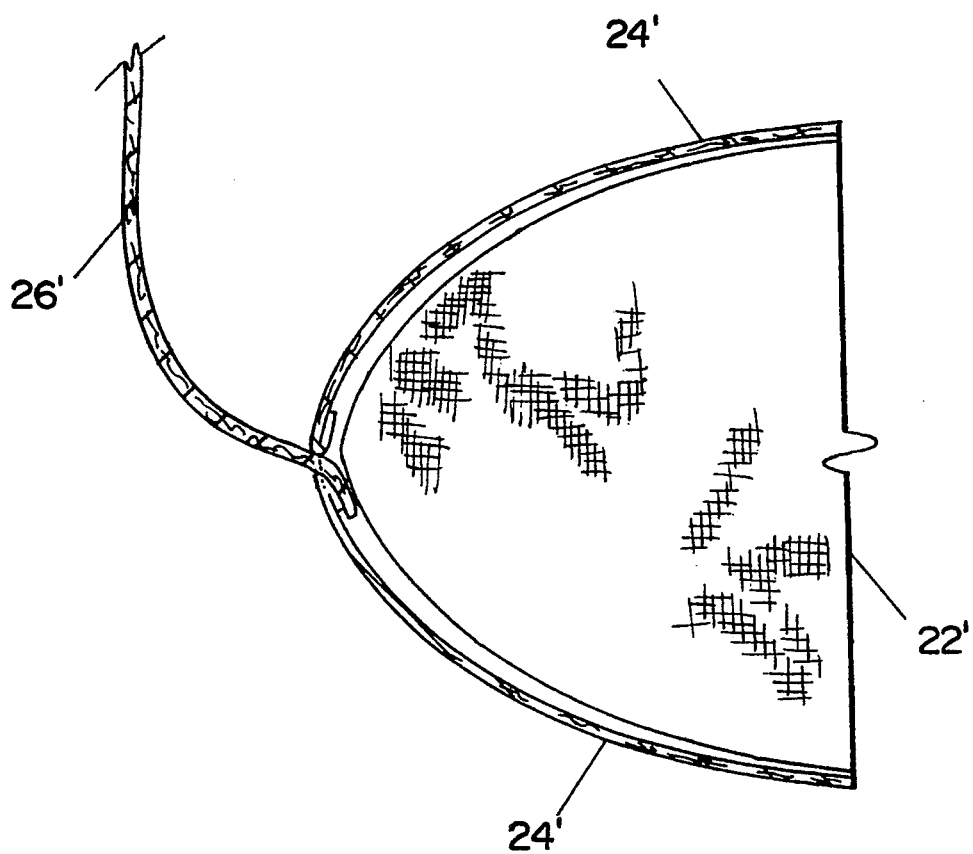
FIG. 8 is a fragmentary cross sectional view taken along the line 8—8 in FIG. 7 and looking in the direction of the arrows.
Figure 9:
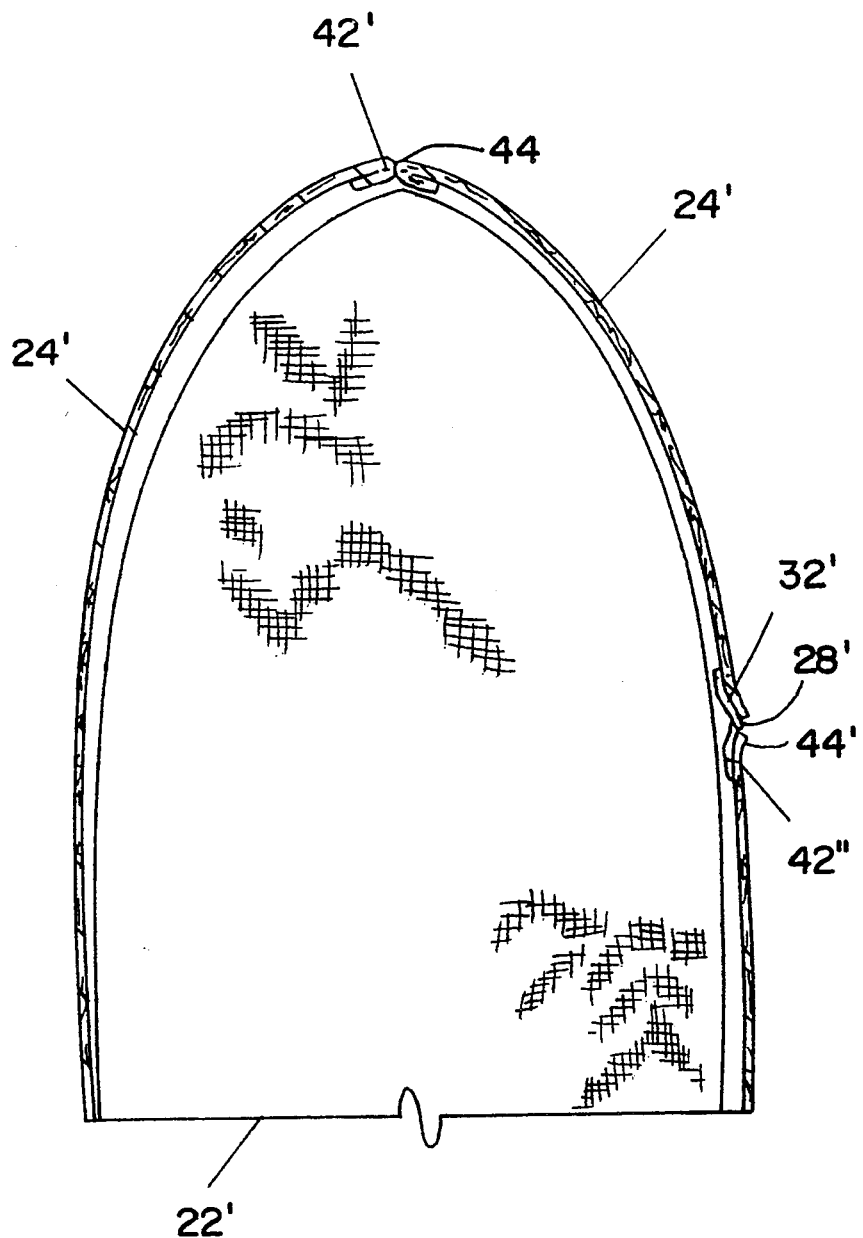
FIG. 9 is a fragmentary cross sectional view taken along the line 9—9 in FIG. 7 and looking in the directions of the arrows.

The invention embodiment shown in FIGS. 1-5 provides for blanket 26, cushion 22 and cover 24 to be substantially elliptical in shape. The embodiment of the invention shown in FIGS. 1-5 also preferably provides for cover 24 to be stitched to zipper 32 by stitches 42, as shown in FIG. 4. Blanket 26 is also preferably stitched to cover 24, as shown in FIG. 5.

It is to be understood, of course, that blanket 26 can be provided with lace trim, for example, or with any other desirable design features.

An alternative embodiment 20' of the pet comforter is shown in FIGS. 6-9. This embodiment of the invention is substantially identical to embodiment 20, but embodiment 20' provides for blanket 26', cushion 22' and cover 24' to be substantially rectangular in shape.

Embodiment 20' also provides for cover 24' to be stitched together by stitches 42' at location 44. See FIG. 9. Zipper 32' is stitched to cover 24' by stitches 42" at location 44'. Blanket 26' is stitched to cover 24' along predetermined portion 36' of perimeter 34' of blanket 26'.

The manner of use of each of embodiments 20, 20' of the invention is identical and use will be described only with respect to embodiment 20.

Cushion 22, cover 24 and blanket 26 are all washable with soap and water. After being cleaned, cushion 22 is inserted into cover 22 through opening 28, and zipper 32 is closed. Comforter 20 is then placed on the floor or in any other suitable location for use by a pet or pets.

If desired, blanket 26 can be positioned over cushion 22 and cover 24 so that the pet or pets can lie on top of blanket 26. Alternatively, the pet can be positioned onto cover 24 and cushion 22, and blanket 26 can then be positioned over the pet or pets to keep the pet warm. See FIG. 2.

Because of the manner in which blanket 26 is attached to cover 24, it is possible to quickly and easily fold back and double over ends 38 or 40 of blanket 26 as shown in FIG. 2. This enables the head of the pet to be exposed while permitting the body portion of the pet to be covered by blanket 26.

Because blanket 26 is attached to cover 24, the blanket is always in proper position for warming the pet. Blanket 26 cannot be lost or separated from cover 24 so that the blanket is always available for use when needed.

This invention provides for a comfortable and attractive pet comforter which is washable and which can be easily transported and stored when not in use. The comforter can be provided in various sizes for pets of different sizes and various designs can be provided on the cover and blanket.

The invention in its broader aspects is not limited to the specific details shown and described, and departures may be made from such details without departing from the principles of the invention and without sacrificing its chief advantages.

What is claimed is:

1. A pet comforter, comprising:
   a cushion;
   a cover for removably receiving said cushion therein;
   a blanket attached to said cover, said blanket defining a perimeter having a lengthwise dimension greater than a widthwise dimensions, said blanket attached to said cover along a predetermined lengthwise portion of said blanket perimeter, said predetermined lengthwise portion of said blanket perimeter being less than said lengthwise dimension, whereby said blanket can be folded to double thickness at predetermined portions of said blanket when said blanket is positioned over said cushion and said cover.

2. A pet comforter as in claim 1 wherein said predetermined lengthwise portion of said blanket perimeter is substantially centered along said lengthwise dimension of said blanket, whereby said blanket can be folded to double thickness at each end of said blanket when said blanket is positioned over said cushion and said cover.

* * * * *